United States Patent [19]

Stürz et al.

[11] Patent Number: 5,101,797
[45] Date of Patent: Apr. 7, 1992

[54] CONTROL SYSTEM FOR A DIESEL INTERNAL COMBUSTION ENGINE

[75] Inventors: Manfred Stürz, Leonberg; Joachim Tauscher, Stuttgart, both of Fed. Rep. of Germany

[73] Assignee: Robert Bosch GmbH, Stuttgart, Fed. Rep. of Germany

[21] Appl. No.: 459,751

[22] PCT Filed: Apr. 28, 1989

[86] PCT No.: PCT/DE89/00274

§ 371 Date: Jan. 11, 1990

§ 102(e) Date: Jan. 11, 1990

[87] PCT Pub. No.: WO89/11034

PCT Pub. Date: Nov. 16, 1989

[30] Foreign Application Priority Data

May 11, 1988 [DE] Fed. Rep. of Germany ....... 3816165

[51] Int. Cl.[5] .............................................. F02M 37/04
[52] U.S. Cl. ...................................... 123/496; 123/506
[58] Field of Search ................ 123/458, 506, 357, 496

[56] References Cited

U.S. PATENT DOCUMENTS

| | | | |
|---|---|---|---|
| 4,327,394 | 4/1982 | Harper | 123/506 |
| 4,653,447 | 3/1987 | Linder | 123/458 |
| 4,653,454 | 3/1987 | Konishi | 123/506 |
| 4,671,232 | 6/1987 | Stumpp | 123/506 |
| 4,793,313 | 12/1988 | Paganon | 123/506 |
| 4,838,232 | 6/1989 | Wich | 123/458 |

FOREIGN PATENT DOCUMENTS 0113510 7/1984 European Pat. Off. .
2072261 9/1981 United Kingdom .

*Primary Examiner*—Carl Stuart Miller
*Attorney, Agent, or Firm*—Walter Ottesen

[57] ABSTRACT

An arrangement for open-loop control or closed-loop control of a diesel internal combustion engine is described wherein the course of injection is electronically open-loop controllable and/or closed-loop controllable. For this purpose, a metering valve is multiply clocked for each metering cycle. In this way, the course of injection can be formed within wide limits in any desired manner. Furthermore, the unit chamber pressure can be controlled.

8 Claims, 1 Drawing Sheet

CONTROL SYSTEM FOR A DIESEL INTERNAL COMBUSTION ENGINE

FIELD OF THE INVENTION

The invention relates to an arrangement for the electronic closed-loop control and/or open-loop control of a diesel internal combustion engine.

BACKGROUND OF THE INVENTION

Such an arrangement is described in the journal "Autotechnik", No. 11, 1983, pages 52 and 53 under the title "Elektrisch gesteuerte Pumpendüsen für schnellaufende Direkteinspritzer-Dieselmotoren". The following is disclosed: a pump nozzle for each cylinder comprising an injection nozzle and a solenoid valve, and further different sensors for operating characteristic variables of the internal combustion engine and an electronic control apparatus. The injected quantity of fuel is metered by a solenoid valve which opens and closes in correspondence to signals of the electronic control apparatus. The injection start and the injected quantity can be controlled independently of each other by the metering start and the pulse width, respectively.

A method and arrangement for closed-loop or open-loop control of a diesel internal combustion engine is known from U.S. Pat. No. 4,378,775 wherein the metered quantity of fuel is controlled by means of a solenoid valve with a distribution injection pump.

It has been shown that the course of injection obtainable with the known arrangements can lead to disturbing combustion noises.

SUMMARY OF THE INVENTION

The invention solves the problem to minimize noise emissions in arrangements of the above-mentioned type.

The arrangement according to the invention for closed-loop control and/or open-loop control of an internal combustion engine having the features of the main claim affords the advantage with respect to the described state of the art that the course of injection can be electronically controlled in correspondence to the requirements of the internal combustion engine. In this way, the noise emission of the internal combustion engine is substantially reduced.

BRIEF DESCRIPTION OF THE DRAWINGS

The invention will be explained in the following with respect to the drawings. A schematic configuration of the arrangement is shown in FIG. 1.

DESCRIPTION OF THE PREFERRED EMBODIMENTS OF THE INVENTION

Figure 1:
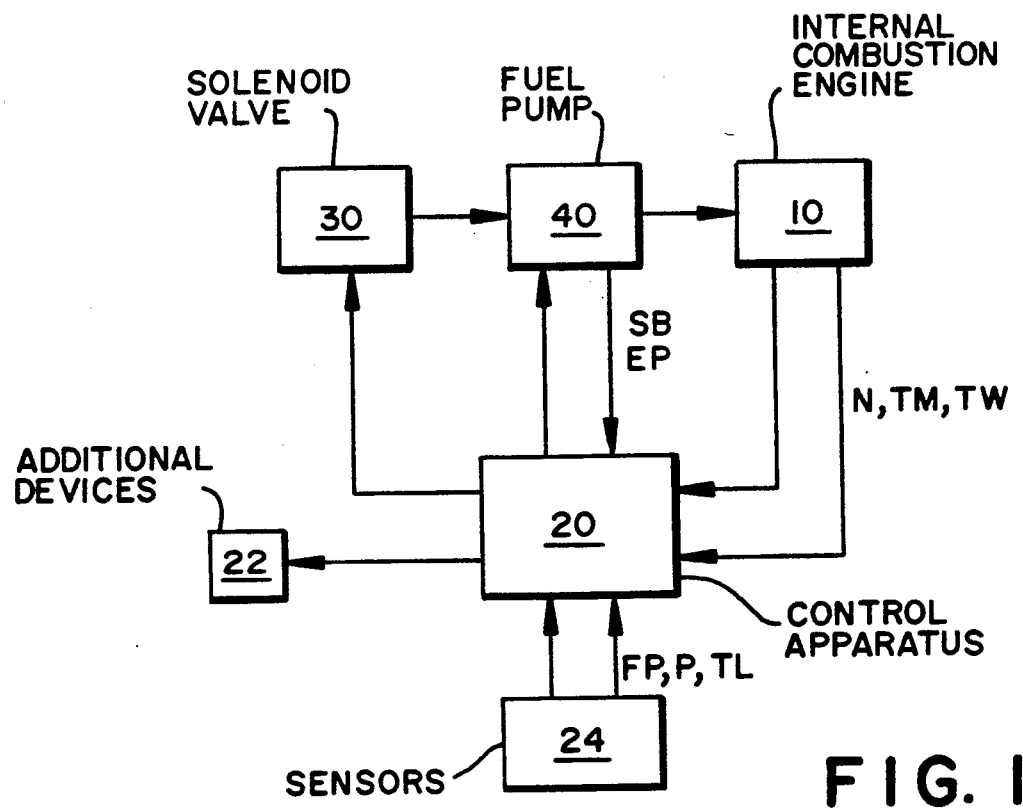

An internal combustion engine is identified with 10 in FIG. 1. Operating parameters such as speed N, temperature of the internal combustion engine TM, cooling water temperature TW and further operating characteristic values of the internal combustion engine are detected by means of various sensors and supplied to the control apparatus 20. The control apparatus 20 receives signals from further sensors 24 with reference to the accelerator pedal position FP, charge pressure P, air temperature TL and further characteristic variables. In addition, signals reach the control apparatus which characterize the injection such as injection start, fuel quantity and unit chamber pressure EP. The control apparatus generates output signals for driving the injection pump 40, for example for driving the actuator of the pump piston and of the solenoid valve 30. Furthermore, additional devices 22 such as glow plugs or the exhaust-gas recirculation can be driven by the control device 20. The solenoid valve 30 opens and closes in correspondence to the drive signals and meters the fuel to the pump work chamber of the fuel pump 40 in a clocked manner. From the fuel pump 40, the fuel is pumped into the internal combustion engine 10.

This arrangement can be so configured that the drive signals can be computed simultaneously for all solenoid valves or the arrangement can be so configured that the drive signals can be computed separately for each solenoid valve. In this case, a control can occur with the arrangement which is specific to a cylinder.

Figure 2A:
FIGS. 2a–c show by example the interrelationship between the drive signal of the solenoid valve, the unit chamber pressure EP and the needle stroke of an injection valve.
Figure 2B:
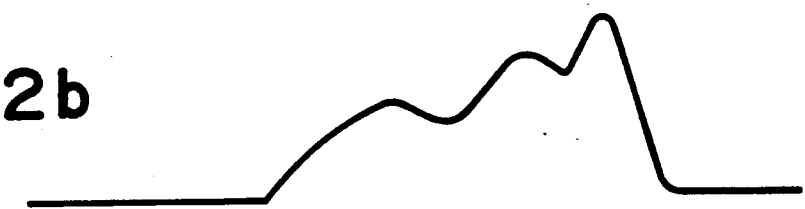
Figure 2C:
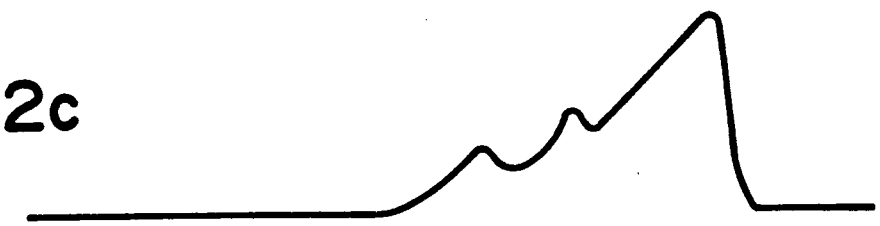

FIG. 2a shows the time-dependent course of the drive signal of a metering cycle for the solenoid valve 30. FIG. 2b shows the unit chamber pressure EP and FIG. 2c the needle stroke which corresponds approximately to the course of injection, which is the time-dependent course of the injected fuel quantity for each fixed time duration. The clock frequency as well as the pulse duty factor are variable within wide limits. The pressure build-up in the pump work chamber (unit chamber) is then dependent upon the clock frequency and the pulse duty factor. The pressure build-up in the unit chamber can be influenced within wide limits by repeatedly clocking the solenoid valves in each metering cycle. A uniform build-up of pressure is obtained by means of a first long drive pulse. In this way, a stable injection start is obtained. This is necessary, among other reasons, for low noise emission. A long injection duration can be obtained by means of a corresponding clocking and this above all affords advantages during idle. The clock frequency and the pulse duty factor determine the course of the pressure build-up in the unit chamber and thereby also the course of the injection. Since the drive signals for the solenoid valves are determined in dependence upon operating characteristic variables, the course of injection can be controlled in a closed-loop or an open-loop manner. A specific pulse duty factor and a specific clock frequency or a specific sequence of different pulse duty factors and/or clock frequencies can be pregiven in dependence upon operating conditions such as charge pressure PL, charge temperature TL, speed N and load for each operating condition.

In dependence upon the temperature of the internal combustion engine, it is possible during idle to realize a long injection duration by means of multiple clocking at a low pulse duty factor.

However, a specific unit chamber pressure or a specific time-dependent course of the unit chamber pressure can be pregiven in dependence upon operating characteristic variables. The solenoid valve then functions as an actuator for a control of the unit chamber pressure.

Such an arrangement can be utilized for all injection systems wherein the metering of fuel is influenced by a magnetic valve.

What is claimed is:

1. An arrangement for controlling a diesel engine comprising:

a fuel injection device for metering fuel to the engine, the device including a pump having a work chamber from which fuel is pumped into the engine;

the device further including an electrically controllable solenoid valve alternately opening and closing for metering fuel to said work chamber thereby causing the valve to influence the duration of injection and/or time point of injection;

a control apparatus connected to said solenoid valve for issuing a drive signal for driving said valve in a clocked manner per metering cycle with the first drive time interval of each metering cycle being longer than each further drive time interval of the same metering cycle.

2. An arrangement for controlling a diesel engine comprising:

a fuel injection device for metering fuel to the engine, the device including a pump having a work chamber wherein pressure is developed and from which fuel is pumped into the engine;

the device further including an electrically controllable solenoid valve alternately opening and closing for metering fuel to said work chamber thereby causing the valve to influence the duration of injection and/or time point of injection;

a control apparatus connected to said solenoid valve for issuing a drive signal for driving said valve in a clocked manner per metering cycle so as to cause said pressure in said work chamber to be controlled to a predetermined desired value; and, said desired value of said work chamber pressure being dependent upon operating characteristic variables.

3. An arrangement for controlling a diesel engine comprising:

a fuel injection device for metering fuel to the engine, the device including a pump having a work chamber wherein pressure is developed and from which fuel is pumped into the engine;

the device further including an electrically controllable solenoid valve alternately opening and closing for metering fuel to said work chamber thereby causing the valve to influence the duration of injection and/or time point of injection;

a control apparatus connected to said solenoid valve for issuing a drive signal for driving said valve in a clocked manner per metering cycle so as to cause said pressure in said work chamber to be controlled to a predetermined desired value; and, said first drive time interval of each metering cycle being longer than each further drive time interval of the same metering cycle.

4. An arrangement for controlling a diesel engine comprising:

a fuel injection device for metering fuel to the engine, the device including a pump having a work chamber wherein pressure is developed and from which fuel is pumped into the engine;

the device further including an electrically controllable solenoid valve alternately opening and closing for metering fuel to said work chamber thereby causing the valve to influence the duration of injection and/or time point of injection; and, a control apparatus connected to said solenoid valve for issuing a drive signal for driving said valve in a clocked manner per metering cycle to control said pressure in said work chamber to a predetermined desired value.

5. The arrangement of claim 4, wherein the clock frequency and the pulse duty factor of the drive signal of said solenoid valve are dependent upon at least one operating characteristic variable.

6. The arrangement of claim 4, wherein at least one of the parameters: engine speed (N), temperature of the charge air (TL), load or charge pressure (PL) is taken as an operating characteristic variable.

7. The arrangement of claim 4, wherein, during idle, the drive signal has a lower pulse duty factor than during normal operation.

8. The arrangement of claim 4, wherein the solenoid valve can be controlled in a manner specific to a cylinder.

* * * * *